Jan. 28, 1969 P. F. GRIEGER ET AL 3,424,617
SEALED BATTERY WITH CHARGE-CONTROL ELECTRODE
Filed Dec. 15, 1965 Sheet 1 of 3

INVENTORS
PHILIP F. GRIEGER
SOL S. JAFFE

BY George H. Fritzinger
AGENT

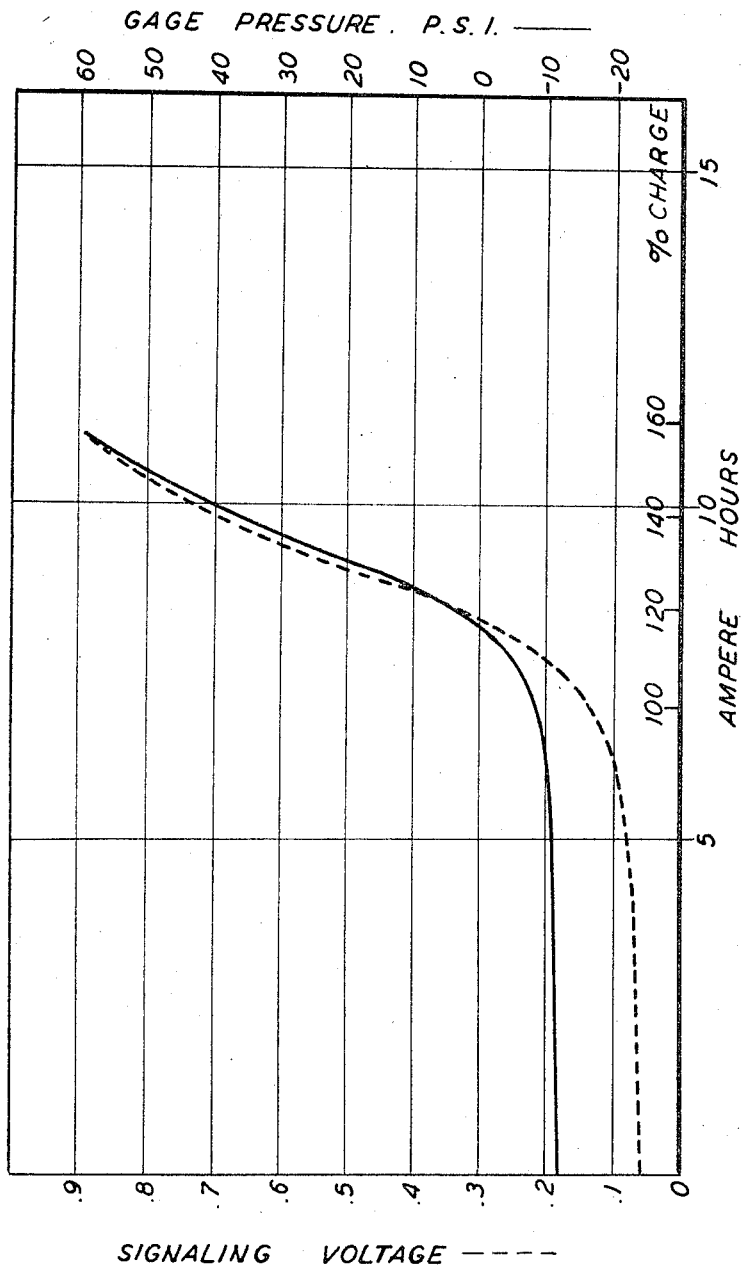

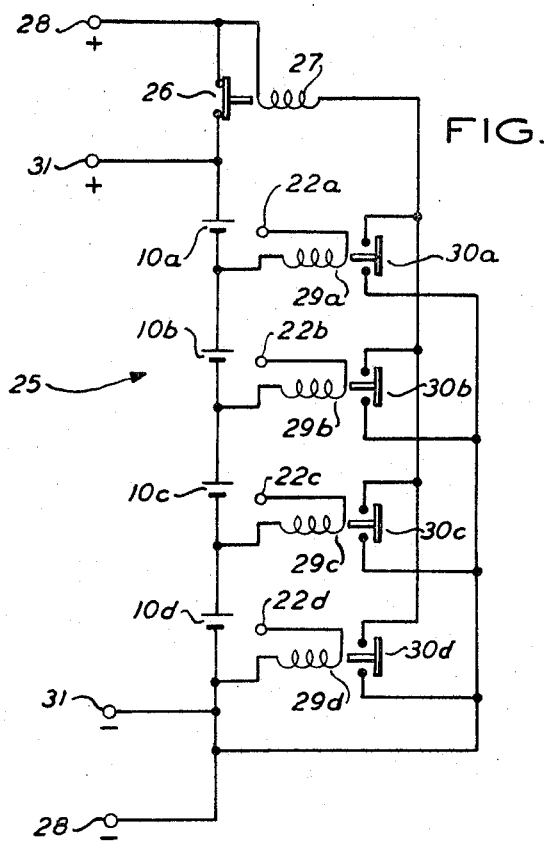
FIG. 8
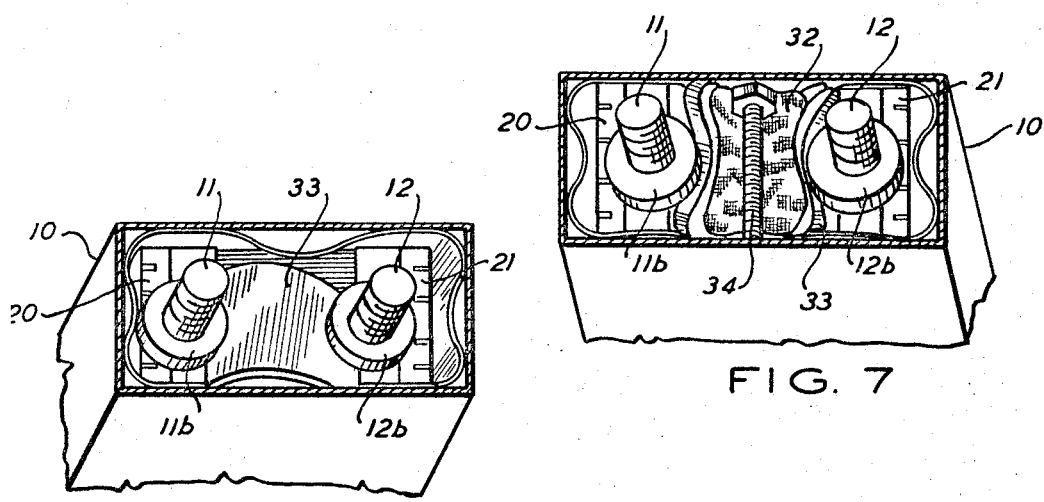
FIG. 7
FIG. 6
INVENTORS
PHILIP F. GRIEGER
SOL S. JAFFE
BY *George H. Fritzinger*
AGENT United States Patent Office 3,424,617
Patented Jan. 28, 1969

3,424,617
SEALED BATTERY WITH CHARGE-CONTROL ELECTRODE
Philip F. Grieger and Sol S. Jaffe, West Orange, N.J., assignors to McGraw-Edison Company, Elgin, Ill., a corporation of Delaware
Filed Dec. 15, 1965, Ser. No. 514,071
U.S. Cl. 136—6                4 Claims
Int. Cl. H01m 45/04

ABSTRACT OF THE DISCLOSURE

A sealed storage battery is provided with an auxiliary electrode for charge control purposes. The battery is of the type having positive electrodes which are oxidized as they are charged and which evolve oxygen on overcharge and having negative electrodes which are reduced as they are charged and which are oxidizable when not fully discharged. The auxiliary electrode includes a carbon cloth electroplated with a catalyst selected from the group consisting of platinum, palladium and silver. A relay connected between the auxiliary electrode and the negative electrode controls a charge circuit for the battery.

---

The preferred example of battery according to the invention, is one of the semi-dry type wherein the positive electrode comprises an active material of nickel oxide herein referred to as a "nickel positive electrode" and wherein the negative electrode comprises an active material principally of cadmium metal herein referred to as a "cadmium negative electrode." However, the invention is applicable also to other batteries such as the so-called silver-cadmium and silver-zinc batteries.

The term "semi-dry" is herein employed to mean a battery employing an electrode pack in which a liquid electrolyte is absorbed without excess liquid electrolyte outside the pack. The advantage of such semi-dry battery is that it can be used in any position both during service and during charging.

In charging batteries to a fully charged condition it is necessary to supply the batteries with an overcharge—i.e., an ampere hours input which is in excess of its rated capacity—because of unavoidable losses in the charging process. Since the charge process during overcharge is inefficient and accompanied by more and more evolution of gas as the overcharge progresses, it has been heretofore necessary to charge sealed batteries at a very slow rate so as to avoid any possible build up of internal pressure to a dangerously high level. A safe charge rate has been at an amperage of C/10 wherein the numeral C is the number of ampere hours capacity of the battery. At this very slow rate of charge the oxygen evolved from the positive electrode even during overcharge is not at a rate in excess of that which the oxygen is combined with the negative electrode; as a result, there is no excessive build up of internal pressure but the time required to charge the battery is excessively long.

An object of the present invention is to provide sealed storage batteries with novel charge-control electrodes which permit the batteries to be charged safely within a wide range of charge rates from the present-day slow rate of C/10 to a maximum rate of 5C or more and which permit the charging to be terminated at inputs which are approximately any selected percentage of the rated capacity up to overcharges of 160% or more.

Sealed batteries have heretofore been provided with charge-conrtol electrodes but these electrodes have had sharp cut-off characteristics which have offered no choice in the selection of the input ampere hours at which the charging is terminated.

By the present invention there is provided an auxiliary electrode which when connected in circuit with the negative electrode will generate a control voltage which remains substantially constant until an overcharge is reached and which then rises substantially uniformly during overcharge in line with the oxygen pressure build-up to permit the charging to be terminated reliably when the battery reaches a preselected overcharge.

It is another object to provide the charge-control circuit of such sealed semi-dry battery with a resistance of a value adapted to suppress hydrogen evolution during charging without reducing substantially the responsiveness of the charge-control voltage to the oxygen pressure.

Further objects of the invention are to provide auxiliary electrodes of a flexible unbreakable character which can be cut to shape and formed to fit any desired or available space, which are free of fragmentary particles that might dislodge and produce shorts, which have a high efficiency requiring negligible addition to the weight and size of the battery, which are electrolyte absorbent to require no electrolyte absorbent separators in conjunction therewith, and which can be produced economically to close specifications.

These and other objects and features of the invention will be apparent from the following description and the appended claims.

In the description of the invention reference is had to the accompanying drawings, of which:

FIGURE 5 is a plot of signal voltage and gas pressure versus ampere hours input during charging of a battery of the embodiment shown in FIGURES 1 to 4;

FIGURE 6 is a perspective end view with the end of the case removed showing an electrode pack adapted for top mounting of an auxiliary control electrode;

FIGURE 7 is another view similar to FIGURE 6 but including the auxiliary control electrode in the mounted position; and FIGURE 8 is a schematic circuit diagram showing one form of charging circuit for the present batteries.

Figure 1:
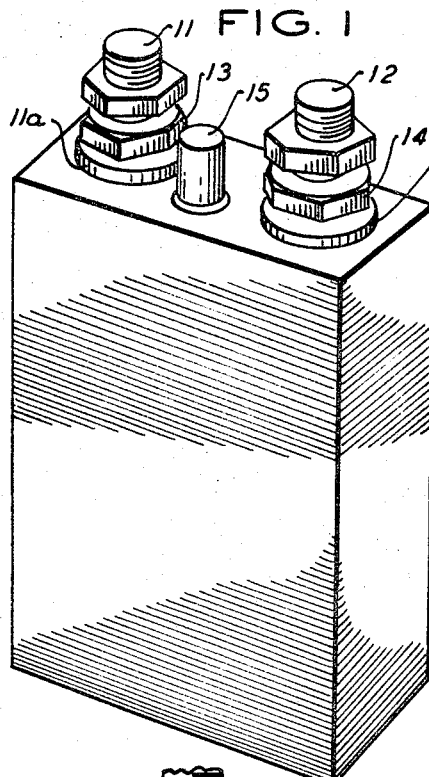
FIGURE 1 is an isometric view of an illustrative battery of rectangular shape embodying the invention.
Figure 2:
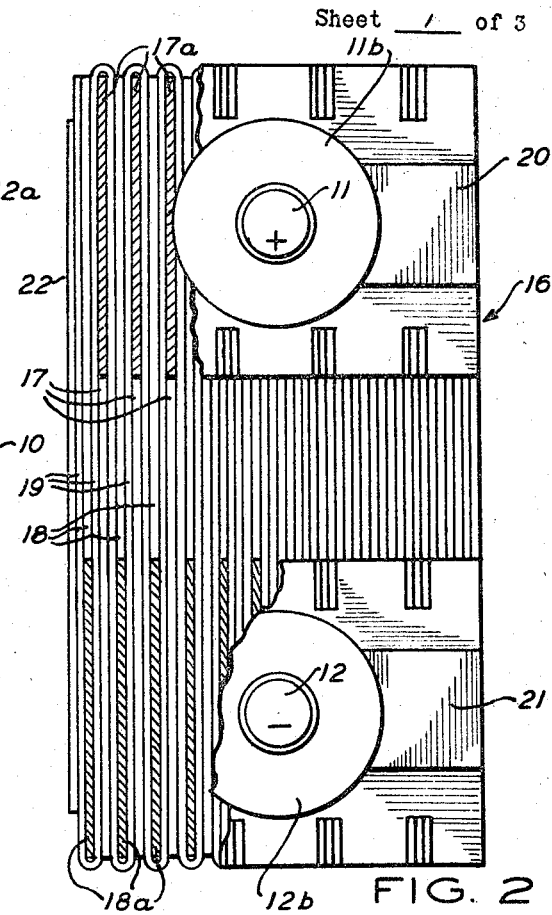
FIGURE 2 is a top view to enlarged scale partly broken away of an electrode pack showing a flat plate-shaped auxiliary control electrode applied against one side of the pack.

The embodiment of the invention shown in FIGURES 1 to 4 includes a rectangular case 10 of a metal such as nickel or nickel-plated steel which is hermetically sealed. Extending upwardly through the top wall are positive and negative terminals 11 and 12 in the form of threaded posts onto which respective nuts 13 and 14 are screwed down tightly against respective rubber grommets 11a and 12a to form air-tight electrically insulated seals between the case and collars 11b and 12b on the terminals. Also, secured as by welding to the top wall of the case is another threaded post 15 which forms a terminal for the auxiliary control electrode of the battery, as is later described.

The battery structure comprises an electrode pack 16 in the form of a stack of alternate positive and negative plate-shaped electrodes 17 and 18 with intervening insulating separators 19 as of nylon cloth or felt. By way of example, the separators may comprise a single sheet or tape starting at one end of the pack and wrapped back and forth around successive positive and negative plates to the other end of the pack. The positve plates have upstanding tabs 17a in a row along one end of the pack and the negative plates having upstanding tabs 18a in a row along the other end of the pack. The tabs 17a and 18a are grouped in threes and secured as by welding to respective transverse combs 20 and 21. Integral with these combs are the respective threaded terminals 11 and 12.

Each electrode may comprise a conducting support which may be apertured, pocketed or finely porous to receive the respective active material. Preferably, a grid structure of nickel plated steel is faced on each side with metallic nickel powder and then sintered thereon by heating the same in an atmosphere of hydrogen or nitrogen to form an integral porous metal body. The supporting body for each negative plate is filled with cadmium, as active material, by impregnating it with a cadmium salt such as cadmium chloride or cadmium nitrate and then cathodically electrolyzing it in an alkaline electrolyte of say potassium hydroxide to reduce the salt to a finely divided metallic cadmium. The supporting body for each positive plate is filled with nickel oxide as active material by impregnating it with a nickel salt such as nickel chloride or nickel nitrate and then anodically electrolyzing it in an alkaline electrolyte of say potassium hydroxide to convert the nickel salt into finely divided nickel oxide.

When such nickel positive electrode is charged the nickel is raised to a higher state of oxidation and if overcharged it evolves oxygen gas. When such charged nickel oxide electrode is discharged against a cadmium metal electrode, the nickel oxide is reduced to a lower state of oxidation and the metallic cadmium is oxidized. So long as the cadmium electrode is not fully discharged to a state of complete oxidation the cadmium electrode is readily oxidizable by oxygen evolved from the positive electrodes. Thus, the oxygen evolved in the battery is taken up by the negative electrode but only at a limited rate as will appear.

In order that oxygen may be evolved from the positive electrodes during overcharge without evolution of hydrogen as would occur if the cadmium negative electrodes were overcharged, the battery is sealed when the charge capacity in the positive electrodes is less than that in the negative electrodes. This may be accomplished by providing the positive electrodes with less active material than the negative electrodes and sealing the battery when both electrodes are uncharged, or it may be accomplished by providing the positive electrodes with a sufficient precharge irrespective of its relative charge capacity that its remaining chargeable capacity is less than that of the negative electrode.

The auxiliary control electrodes of the present invention are made by electrodepositing a suitable catalyst such as platinum, palladium or silver onto a carbonized cloth. Carbonized cloths are fabrics woven of fibers of substantially pure carbon or graphite, but mats or felts made of felts made of such fibers are also useable. The carbon cloth may be plated 30 cycles with grey platinum having a matte finish of high electrochemical activity. Preferably, however, the carbon cloth is first plated 15 cycles with grey platinum and then is plated 45 cycles with black platinum. The plating with grey platinum is carried out, for example, in an aqueous plating solution containing 30 grams per liter of chloroplatinic acid (40% platinum by weight), and the overplating with black platinum is carried out in a bath of the same composition except that it contains also 0.2 gram of lead acetate ($PbAc_2 \cdot 3H_2O$) per liter. Plating of 3″ squares of carbon cloths is carried out at 2000 milliamperes, with the direction of the current being reversed every 30 seconds and with the plating being stopped as the last cathodic half-cycle comes to a close. Each plating cycle is therefore 1 minute long comprising 30 seconds anodic plating plus 30 seconds cathodic. In practice, from 0.1 to 0.2 gram of platinum are deposited in 15 to 45 cycles by the above process. The advantage of plating black platinum on grey platinum is that it improves the adherence of the black platinum.

Figure 3:
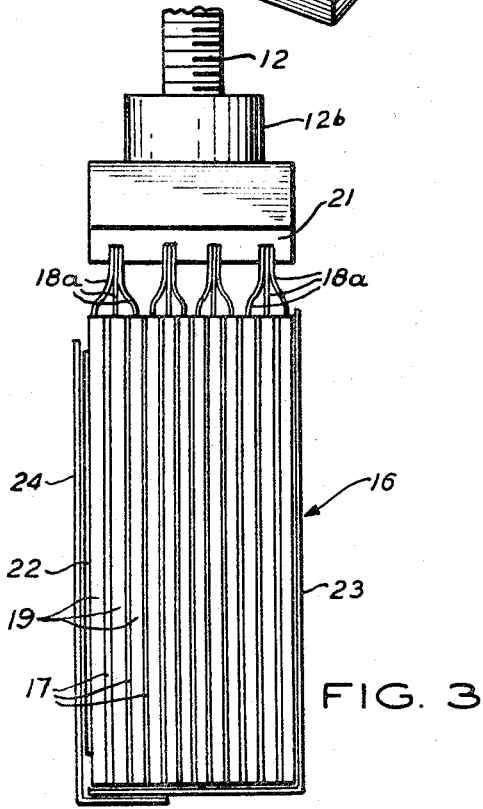
FIGURE 3 is an end view of the electrode pack to normal scale showing additionally an L-shaped metal shim against the auxiliary control electrode and an L-shaped insulator shim against the other side of the pack.
Figure 4:
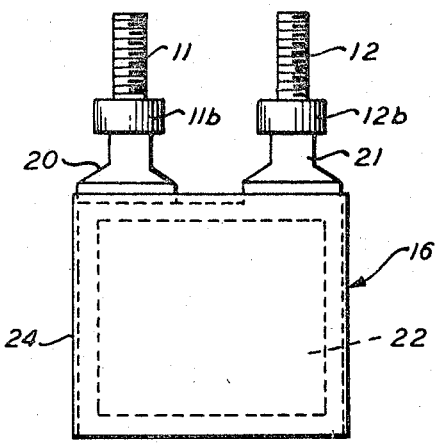
FIGURE 4 is a left-hand side view to reduced scale of the electrode pack as shown in FIGURE 3.

In the preferred embodiment of the invention a sheet 22 of platinized carbon cloth, as an auxiliary control electrode, is applied against the nylon separator sheet 19 at one side of the electrode pack (FIGURE 3). This electrode pack is typically provided with a 30% aqueous solution of potassium hydroxide by weight to an extent less than saturation by the order of 10% to 20%. As electrolyte solution is added it is absorbed by the nylon separator sheets 19, the plate electrodes 17 and 18 and the platinized carbon cloth electrode 22. Since the pack is not fully saturated there is no excess liquid electrolyte in the case around the pack, giving the pack a semi-dry appearance. In the side mounting of the auxiliary control electrode 22 it is vitally important that the electrode pack 16 be not fully saturated with electrolyte in order to attain maximum performance.

Before the electrode pack 16 is inserted into the case there is applied to its side opposite to the auxiliary electrode 22 an L-shaped shim 23 of insulating material having a lower leg traversing the pack throughout the width thereof, and there is applied against the auxiliary control electrode 22 another L-shaped shim 24 of a metal such as nickel or nickel plated steel. These shims confine the plate electrodes to enable the pack to be inserted into the case under sidewise compression. Additionally, the shim 23 insulates the pack from the case while the shim 24 provides an electrical connection of the auxiliary control electrode 22 to the case. The terminal 15 welded to the case therefore becomes an external electrical terminal for the auxiliary control electrode. There being no free flowing electrolyte in the case, there is unavoidably provided some gas space in the case around the pack and especially across the top thereof. After the pack is inserted in the case in the manner described, the top of the case 10 is sealed in place and the nuts 13 and 14 are tightened down onto the grommets 11a and 12a to seal the terminals 11 and 12 to the case.

As an illustrative example, a battery of the character above-described may have a deliverable output of 7 ampere hours after being charged for 12.5 hours at 0.7 ampere. The C rating of such a battery is therefore 7 as before described. When this battery is discharged and then recharged at 2c (14 amperes) to a 60% overcharge (11.2 ampere hours) with a resistance $R_s$ of 6.5 ohms connected in the signaling circuit between the auxiliary control electrode and the negative electrode, the measured oxygen gas pressure and the signaling voltage in the auxiliary control circuit versus the charge input in ampere hours is as shown by the curves in FIGURE 5. These curves show that the gas pressure and signaling voltage both remain nearly constant throughout the charging operation until the battery receives its rated ampere hours charge and that thereupon during overcharge the gas pressure and the signaling voltage both increase nearly linearly with the signaling voltage rising to .9 volt and the pressure rising to 60 p.s.i. as the charge input is increased to 160% of the rated ampere hours. This gradual and nearly linear rise in the signaling voltage enables the charge input to be terminated automatically at any predetermined overcharge with the use of commercial control apparatus. Further, tests have shown that approximately the same operating curves are obtained as are shown in FIGURE 5 whether the charge rate is at the very low value of only C/10 or at the high rate of 5C.

In FIGURE 8 there is shown a charge control circuit 25 for the present battery wherein a group, for example, of four batteries—herein considered as four individual cells—10a, 10b, 10c and 10d are connected serially through a pair of normally closed switch contacts 26 of a master control relay 27 to a pair of charge terminals 28. The cells have auxiliary charge control electrodes 22a–22d connected through respective relay coils 29a–29d to the negative electrodes 18a–18d of the respective cells. The master relay 27 is connected across the charge terminals 28 through the respective normally open switch contacts 30a–30d of the charge control relays 29a–29d with the switch contacts 30a–30d being in parallel with each other. The relays 29a–29d are preset to operate at a selected signaling voltage on the rising portion of the curve shown in FIGURE 5, with the result that whenever any one of the cells in the charge circuit receives an overcharge corresponding to the preset signaling voltage the respective charge control relay is operated to activate the master relay and cutoff the charge circuit. A second set of terminals 31 in the charge control circuit is connected directly across the series connection of cells to serve as dischrage terminals.

In FIGURES 6 and 7 there is shown an alternative embodiment of the invention wherein an auxiliary charge control electrode 32 again made of platinized carbon cloth is wound into a roll form and placed above the electrode pack 16 between the two combs 20 and 21 in what is herein referred to as a "top mounting." Before inserting the auxiliary electrode 32 a pad 33 of electrolyte separator materials as of nylon is seated onto the electrode pack (FIGURE 6) against the top edges of the separator sheets 19 extending above the electrodes. The electrode 32 is then placed on the pad 33 and clamped down under pressure by a cross bolt 34 (FIGURE 7) secured to the case. The pad 33 and separator sheets 19 serve as a wick to form an electrolyte bridge between the auxiliary control electrode and the negative and positive electrodes of the battery. In this second embodiment it is important that the electrode pack 16 be fully saturated with liquid electrolyte but that it is preferred that the pack be still in a semi-dry condition wherein there is no excess liquid electrolyte in the case so that the battery can be charged in any position.

Advantages of the present auxiliary control electrodes are that they are unbreakable and can be cut to any desired shape so that they can be formed (rolled or folded) to fit into any waste space in the battery case. Also, the auxiliary electrodes are of a highly coherent structure which does not crumble or break off into pieces to produce a danger of "shorts" in the battery. In the sheet form of platinized carbon cloth for a side mounting as is shown in FIGURES 1 to 4 the weight is only 0.2 gram per sq. inch of the auxiliary electrode and the thickness of the auxiliary electrode taken with two layers of separator material is only 0.031". Thus, the auxiliary electrode adds a negligible amount to the weight and volume of the battery. A further advantageous feature of the present auxiliary control electrode is that it requires no waterproofing but will instead absorb and immobilize electrolyte to permit the platinized carbon cloth to be used in multi-layer assemblies without the need of interposed electrolyte absorbent material. When the auxiliary electrode is soaked with electrolyte it catalyzes the $H_2$ and $O_2$ reaction at a safe rate so that small amounts of hydrogen that may be evolved during the early stages of charging are consumed at a safe rate when the oxygen is evolved from the positive electrode. Since the catalyst is provided by electrodeposition it can be accurately controlled to enable production to be achieved with a high degree of conformity. Likewise, the auxiliary control electrodes then have also uniform performance characteristics after repeated charge-discharge cycling of the battery. Very importantly, the polarization curves as are shown in FIGURE 5 are very strongly dependent on the oxygen pressure to enable the charging to be terminated reliably when the battery has received a preset adequate overcharge.

The embodiments of our invention herein particularly shown and described are intended to be illustrative but not necessarily limitative of our invention, since the same are subject to changes and modifications without departure from the scope of our invention, which we endeavor to express according to the following claims.

We claim:

1. A sealed storage battery capable of being repeatedly charged and discharged and comprising a case having therein a gas space and an electrode pack with absorbed liquid electrolyte, said space being free of liquid electrolyte and said pack containing alternate positive and negative electrodes with intervening insulating separators, said positive electrodes being oxidized as they are charged and evolving oxygen gas when overcharged and said negative electrodes being reduced on charging and being readily oxidizable so long as the electrodes are not fully discharged, said electrodes being further characterized in that the charge capacity of the postive electrodes is less than the hydrogen-free charge capacity of the negative electrodes when the case is sealed, an auxiliary charge-control electrode in contact with said electrolyte and with said gas space, said auxiliary electrode comprising a carbon cloth electroplated with grey platinum, a charge-control circuit connected between said auxiliary electrode and said negative electrodes whereby oxygen evolved from said positive electrodes is electrochemically reduced at said auxiliary electrode with the resultant flow of current in the charge-control circuit causing oxidation of the negative electrode, and a relay in said charge-control circuit for opening said charge circuit when said battery reaches a predetermined overcharge.

2. The sealed storage battery set forth in claim 1 wherein said carbon cloth of said auxiliary electrode is electroplated with black platinum on grey platinum.

3. A sealed storage battery capable of being repeatedly charged and discharged and comprising a case having therein a gas space and an electrode pack with absorbed liquid electrolyte, said space being free of liquid electrolyte and said pack containing alternate positive and negative electrodes with intervening insulating separators, said positive electrodes being oxidized as they are charged and evolving oxygen gas when overcharged and said negative electrodes being reduced on charging and being readily oxidizable so long as the electrodes are not fully discharged, said electrodes being further characterized in that the charge capacity of the positive electrodes is less than the hydrogen-free charge capacity of the negative electrodes when the case is sealed, an auxiliary charge-control electrode in contact with said electrolyte and with said gas space, said auxiliary electrode comprising a carbon cloth electroplated with a catalyst selected from the group consisting of platinum, palladium and silver, a charge-control circuit connected between said auxiliary electrode and said negative electrodes whereby oxygen evolved from said positive electrodes is electrochemically reduced at said auxiliary electrode with a resultant flow of current in the charge-control circuit causing oxidation of the negative electrodes, a charge circuit for said battery, and a relay in said charge-control circuit for opening said charge circuit when said battery reaches a predetermined overcharge.

4. A sealed storage battery capable of being repeatedly charged and discharged and comprising a case having therein a gas space and an electrode pack saturated with absorbed liquid electrolyte, said pack containing alternate positive and negative electrodes with intervening insulating separators extending above said electrodes, said positive electrodes being oxidized as they are charged and evolving oxygen gas when overcharged and said negative electrodes being reduced on charging and being readily oxidizable so long as the electrodes are not fully discharged, said electrodes being further characterized in that the charge capacity of the postive electrodes is less than the hydrogen-free charge capacity of the negative electrodes when the case is sealed, a pad of insulating separator material applied against the top of said pack in contact with the top edges of the separators between said electrodes, and an auxiliary charge-control electrode applied against said pad, said auxiliary electrode comprising a carbon cloth electroplated with a catalyst selected from the group consisting of platinum, palladium and silver, said electroplated carbon cloth being wound in roll form, and terminal means contacting said auxiliary electrode and secured to said case.

References Cited

UNITED STATES PATENTS

| | | | |
|---|---|---|---|
| 2,928,889 | 3/1960 | Bonner et al. | 136—24 |
| 2,951,106 | 8/1940 | Ruetschi | 136—6 |
| 3,002,041 | 9/1961 | Daley | 136—176 |
| 3,037,066 | 5/1962 | Grieger et al | 136—6 |
| 3,080,440 | 3/1963 | Ruetschi et al. | 136—3 |

WINSTON A. DOUGLAS, *Primary Examiner.*

A. SKAPARS, *Assistant Examiner.*